United States Patent [19]

Schäel et al.

[11] 4,141,835
[45] Feb. 27, 1979

[54] APPARATUS FOR THE MASS TRANSFER BETWEEN TWO MEDIA

[75] Inventors: Wilfried Schäel; Jan-Erik Sigdell, both of Bad Homburg; Gerd E. Krick, Usingen, all of Fed. Rep. of Germany

[73] Assignee: Dr. Eduard Fresenius Chemisch-Pharmazeutische Industrie KG Apparatebau KG., Bad Homburg, Fed. Rep. of Germany

[21] Appl. No.: 840,758

[22] Filed: Oct. 11, 1977

[30] Foreign Application Priority Data
Oct. 14, 1976 [DE] Fed. Rep. of Germany ....... 2646358

[51] Int. Cl.² ............................................... B01D 31/00
[52] U.S. Cl. ................................ 210/321 A; 210/304; 210/321 R; 210/321 B; 210/456
[58] Field of Search ................. 210/304, 22, 321, 456, 210/433 M

[56] References Cited

U.S. PATENT DOCUMENTS

| 3,402,529 | 9/1968 | Frantz | 210/304 X |
| 3,536,611 | 10/1970 | DeFilippi et al. | 210/22 |
| 3,648,754 | 3/1972 | Sephton | 210/304 X |
| 3,768,653 | 10/1973 | Brumfield | 210/304 X |

FOREIGN PATENT DOCUMENTS

| 2542438 | 3/1977 | Fed. Rep. of Germany | 210/321 |
| 523699 | 11/1976 | U.S.S.R. | 210/321 R |

Primary Examiner—Frank A. Spear, Jr.
Attorney, Agent, or Firm—W. G. Fasse; D. F. Gould

[57] ABSTRACT

The present mass transfer apparatus between two media is especially adapted to blood dialysis. To assure an undisturbed flow of the blood through the dialyser and to avoid coagulation all flow channels are shaped to avoid dead corners and choking zones so that the blood is prevented from forming wakes or so-called "dead waters" in its flow path. For this purpose a hollow space is formed adjacent to the open ends of the hollow fibers. The inlet and/or outlet to this hollow space may extend radially axially or tangentially.

12 Claims, 9 Drawing Figures

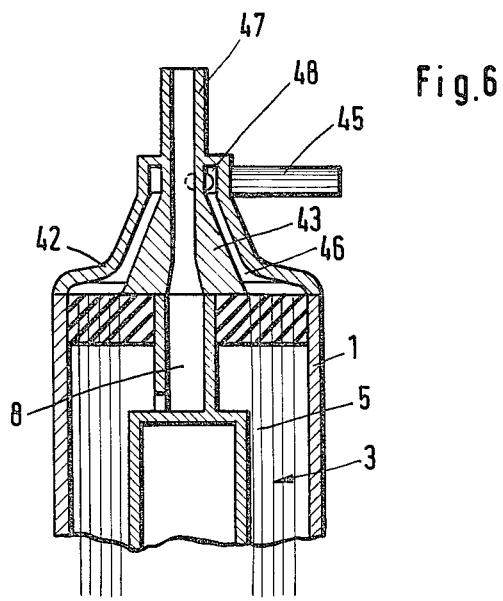
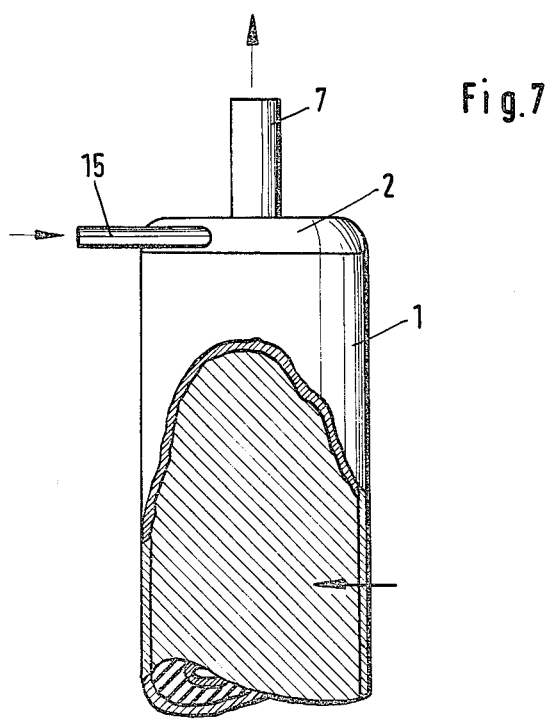

APPARATUS FOR THE MASS TRANSFER BETWEEN TWO MEDIA

BACKGROUND OF THE INVENTION

The invention relates to an apparatus for the mass transfer between two media, for example, for the dialysis of blood relative to a dialysis liquid. The apparatus comprises a housing containing a core surrounded by hollow fibers. The housing further contains for each of the two media one influx chamber and an out-flow chamber, whereby one ring shaped chamber each is operatively connected to the two facing ends or rather, with the openings of the hollow fibers.

Heretofore, known devices of the mentioned type exhibit the disadvantage that there is an increased tendency for the coagulation of the blood, that the distribution of the blood flow onto the individual hollow fibers is non-uniform, and that the wash contact of the dialysis solution with the individual hollow fibers is also non-uniform. A non-uniform distribution of the flow through the hollow fibers as well as a non-uniform wash contact of the hollow fibers with the dialysis solution result in a decrease of the exchange efficiency relative to the theoretically possible exchange efficiency. It is possible to compensate for such decreased exchange efficiency to a certain extent by increasing the through flow of the dialysis solution. However, such increase of the through flow results in an increase consumption of dialysis solution or it requires an additional technical effort for the recirculation of the dialysis solution. A non-uniform distribution of the through flow of blood causes the coagulation of the latter because the blood tends to coagulate preferably in those hollow fibers in which it flows more slowly. Similar disadvantages occur in mass exchange devices constructed for different purposes.

OBJECTS OF THE INVENTION

In view of the above, it is the aim of the invention to achieve the following objects, singly or in combination:

to avoid the above outlined drawbacks of the prior art, more specifically, to improve the shearing forces in the medium flowing in the hollow fibers by improving the flow conditions;

to construct and shape the flow paths so that choking zones and wake zones are avoided; and to prevent a prolonged residence or retention time of the thrombocytes in blood dialysis thereby preventing the sticking of such thrombocytes to the walls of the elements through which the blood flows and to thus also prevent the coagulation of the blood.

SUMMARY OF THE INVENTION

For achieving said objects the invention provides that the inlet chamber and/or the outlet chamber for the medium flowing through the hollow fibers forms a hollow space between the respective connecting flange and the facing ends of the hollow fibers, said hollow space producing a uniform flow distribution. The configuration of all the flow paths is substantially free of choking zones and hence a flow contact between the media and the boundary walls of the apparatus is produced.

Said hollow space may be formed in the housing and/or in a respective housing cover; in any event, stationary or substantially static contacts between the flowing media and the walls of the flow paths are avoided.

The special configuration of the hollow space provides the advantage that the flowing medium in said hollow space may change into a substantially undisturbed or laminar flow in which there do not occur any substantial turbulences. Such turbulences would enhance the formation of agglomerates of suspended particles. Above all, this feature makes sure that a substantially uniform wash contact of all boundary surfaces is accomplished and that the flow is maintained substantially free of choking zones.

The inflow space for supplying the liquid flowing in the hollow fibers, may have a ring shape at one end of the hollow fiber bundle, said ring shape extending above the open fiber ends, and the liquid is supplied tangentially into the ring space.

Instead of having a ring shape, the hollow space may also be formed to have a funnel configuration having inner and outer boundary walls of a frustum type. The funnel shaped hollow space may taper axially in its cross sectional area toward the connecting pipe section or it may merge tangentially at this end into a connecting pipe section extending transversely.

Another advantage is achieved in a ring member to which the liquid is supplied tangentially, if the cross sectional area of the ring chamber tapers from the inlet pipe section thrugh the circumferential angle to a point where the inlet pipe section begins. Stated differently, the cross sectional area of the ring chamber should taper in the flow direction through an angle of almost 360°.

The direction of the tangential inlet into the ring chamber and the winding direction of the hollow fibers should correspond to each other.

BRIEF FIGURE DESCRIPTION

In order that the invention may be clearly understood, it will now be described, by way of example, with reference to the accompanying drawings, wherein:

FIG. 6 is a longitudinal section through a fourth example embodiment according to the invention;

FIG. 7 is a view of a further example embodiment of the invention;

DETAILED DESCRIPTION OF PREFERRED EXAMPLE EMBODIMENTS

Figure 1:
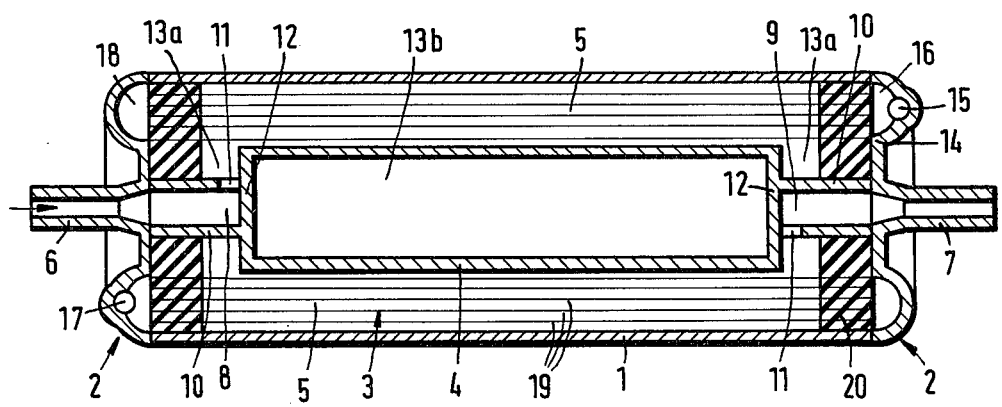
FIG. 1 shows a longitudinal section through a first embodiment according to the invention.

In the example embodiment of FIG. 1 a housing 1 is closable at both of its facing ends by covers 2. The housing 1 holds inside thereof a dialysis cartridge 3.

The cartridge 3 comprises a core 4 on which there are secured hollow fibers 19 known as such. These fibers do not completely fill the ring gap 5 between the core 4 and the housing 1. Rather, the fibers are slightly spaced from each other so that there is space therebetween for the passage of one medium whereas the other medium is conducted through the inside of the hollow fibers.

The cartridge 3 is provided with a gasket 20 at its facing ends in such a manner that the ring gap 5 is sealed completely relative to the outside so that here only the open ends of the hollow fibers 19 are accessible from the facing end.

The two cover members 2 are each provided with one inlet pipe section 6 or with one outlet pipe section 7 for the dialysis solution. The inlet pipe section 6 merges into an inflow chamber 8 whereas the outlet pipe section 7 is connected to an outflow chamber 9. These chambers are formed by tubular extensions 10 of the core 4. The tubular extensions 10 have openings 11 distributed about their circumference adjacent to the core. The openings 11 lead into the ring space 13a. The inflow into the space 5 and the outflow of the space 5 takes place through these openings 11.

The space 5 is partially filled with hollow fibers. Transversely extending walls 12 separate the chambers 8 and 9 or extensions 10 from the inner hollow space 13b of the core 4.

The facing surfaces 14 of the cartridge 3 contact the covers 2 directly and in a sealing manner except in the ring shaped area in which the open ends of the hollow fibers 19 are located. A ring shaped inlet chamber 16 is arranged here. The chamber 16 is connected to an inflow pipe section 15. A discharge pipe section 17 is arranged in the cover 2 at the opposite end of the cartridge 3. The discharge pipe section 17 merges into a ring shaped outlet chamber 18.

Figure 2:
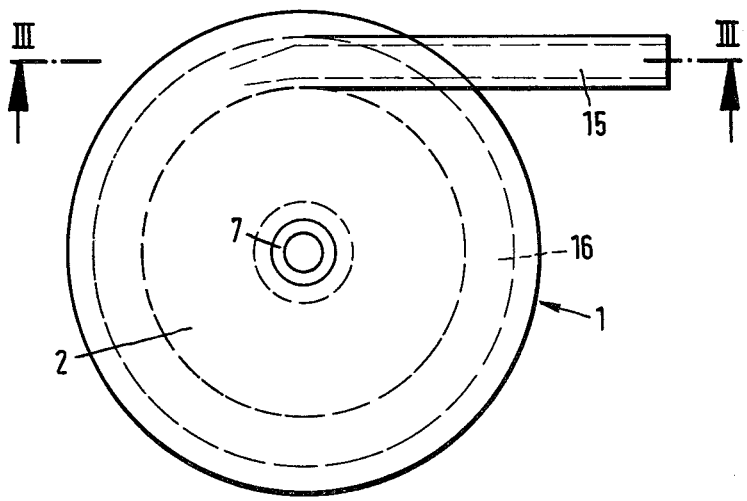
FIG. 2 is a face or top plan view of the example embodiment according to FIG. 1.
Figure 3:
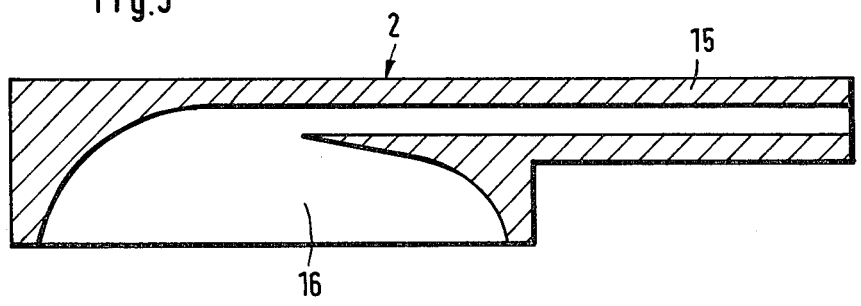
FIG. 3 is a sectional view along the section line III — III in FIG. 2.

As may be seen from FIGS. 2 and 3 in conformity with FIG. 1, the pipe sections 15 and 17 merge tangentially into the ring shaped inlet chamber 16 and outlet chamber 18 respectively. Thus, a circular ring flow is excited in these chambers. The ring flow causes a uniform traversing of the open ends of the hollow fibers 19 and of the boundary surfaces of the ring space. In this manner it is prevented that choking zones can be formed at individual points at which otherwise a coagulation could occur if blood is flowing therethrough. This applies especially to the influx side, however, also for the outflow side of the cartridge 3. Thus, the pressure difference between the inlet side and the outlet side is slowly determining the flow through the hollow fibers, whereby it is evident that the flow in the ring shaped chambers is not influenced hereby. The flow speed adapts itself automatically to the throughput through the hollow fibers. It is a prerequisite that, as is evident from FIG. 3, the transitions from the chambers to the pipe sections extend continuously without any corners in which a wake flow could form.

Figure 4:
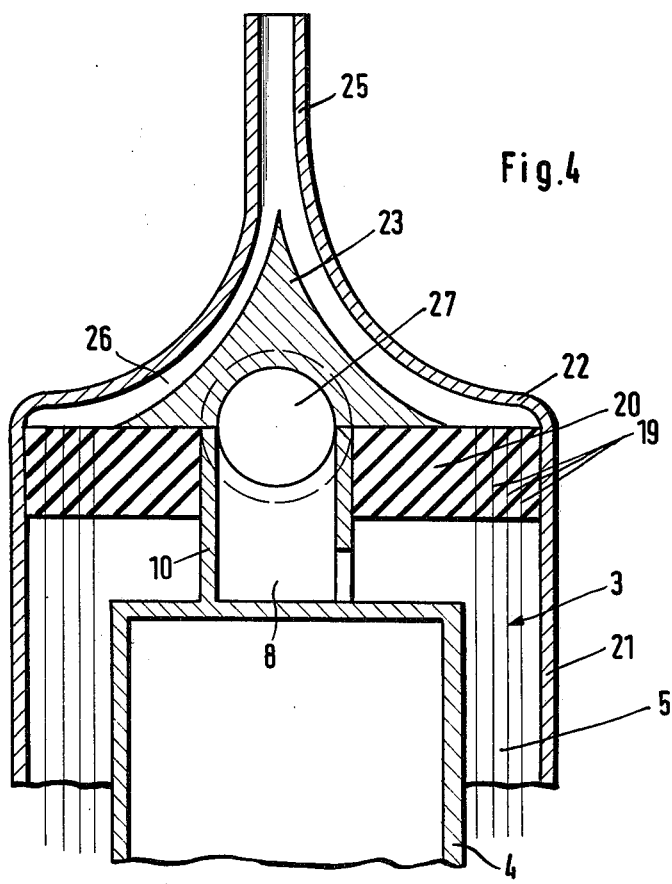
FIG. 4 illustrates a partial longitudinal section of a further example embodiment according to the invention.

In the embodiment of FIG. 4 the aim of achieving a uniform flow onto the facing ends of the hollow fibers is accomplished in another manner.

The catridge 3 is constructed in the same manner as in the example embodiment of FIG. 1 so that the same members are provided with the same reference numbers. This cartridge is supported in a tubular housing 21 which is closed at both ends by covers 22. One cover 22 comprises a substantially conical flow guide body 23 located inside the cover 22. The cover 22 merges outwardly into a connecting pipe section 25 which may serve as an inlet pipe section or as an outlet pipe section. The inner wall of the cover 22 is also shaped substantially conically so that between the inner wall and the guide body 23 a chamber 26 is formed which is similar to a funnel. This chamber has a width which is smaller in the area adjacent to the inlet pipe section 25 than in the area where the chamber merges into the hollow fibers 19.

A liquid flowing from the connecting pipe section 25 comes to rest in this funnel shaped chamber having a gradually increasing cross section; that is, the flow speed of the liquid diminishes gradually. In this embodiment again corners are avoided which could facilitate the formation of wake. The medium flows smoothly through the chamber between the connecting pipe section 25 and the hollow fibers 19.

As a modification relative to the example embodiment of FIG. 1, the inlet pipe sections shown at 27 in FIG. 4 and provided for the second medium which flows through the hollow space between the hollow fibers, are connected at an angle to the chambers, for example, the influx chamber 8.

Figure 5:
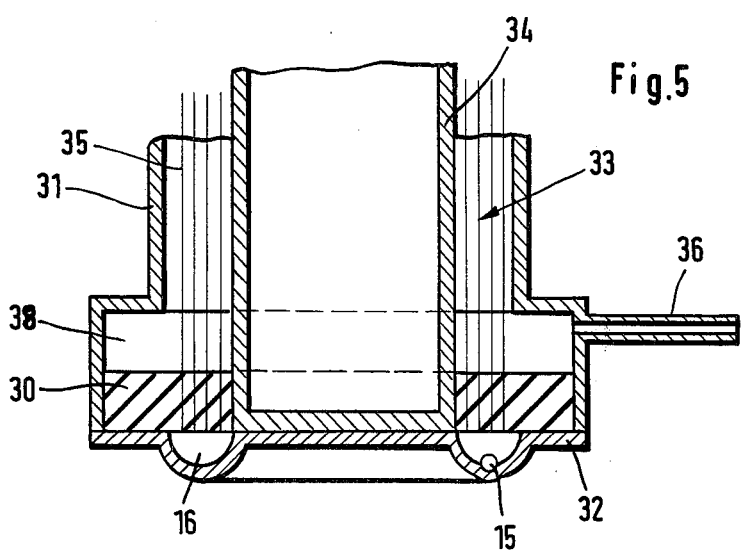
FIG. 5 is a longitudinal section through a facing end of a third example embodiment according to the invention.

The example embodiment of FIG. 5 deviates from the two above mentioned example embodiments with regard to the construction of the cartridge 33 as well as with regard to the housing covers 32. Thus, the facing end gasket 30 of the cartridge 33 has a larger diameter and extends as a flange relative to the bundle of hollow fibers. The housing wall 31 overlaps this gasket to the cover 32 so that a ring chamber 38 is formed behind this gasket 30 and in front of the widening of the housing 31. A pipe section 36 merges into this chamber 38. The second medium reaches the space 35 from this ring shaped chamber. The space 35 remains between the hollow fibers, that is, between the housing 31 and the core 34.

The open ends of the hollow fibers of this embodiment open into a ring shaped chamber 16. A connecting pipe section 15 merges into the chamber 16 in the same manner as has been described with reference to the example embodiment of FIG. 1.

The connecting pipe section 36 merges radially or tangentially into the ring shaped chamber 38 so that here also an improvement of the flow distribution is achieved.

In the example embodiment of FIG. 4 it is necessary to interrupt the ring shaped chamber 26 at a point so that the pipe section 27 may pass through to the outside. This solution is not completely satisfactory from a flow technical point of view and is avoided by the example embodiment of FIG. 6.

In the example embodiment of FIG. 6, the housing 1 and the cartridge 3 are constructed in the same manner as in the example embodiments of FIGS. 1 and 4. The housing cover 42 corresponds to the structure of FIG. 4 as far as the shape of the inlet chamber 46 is concerned. However, further improvements of a flow technical type are provided.

Thus, the inner guide body 43 comprises an axial bore which merges into the connection pipe section 47. A ring shaped chamber 48 is located at the outer end of the funnel shaped chamber 46 and around the connecting pipe section 47. A connecting pipe section 45 is tangentially connected to the ring shaped chamber 48 similarly as is shown in the top plan view of FIG. 2. The medium flowing through the connecting pipe section 45 communicates with the free ends of the hollow fibers through the space 46, whereas the medium flowing through the pipe section 47 also flows through the ring gap 5 of the cartridge.

The flow through the funnel shaped chamber 46 takes place in combination with the effects according to the arrangement of FIGS. 1 and 4, that is about in a helical manner. The medium flowing through the pipe section 47 enters into the influx chamber 8 in the axial direction as in the example embodiment of FIG. 1.

The example embodiment of FIG. 6 has the advantage that a bend in the passage of the connecting pipe section 27 as shown in FIG. 4 is avoided.

In the example embodiment of FIG. 7 the housing 1 and the cover 2 are constructed as in the example embodiment of FIG. 1. The outflow pipe section 7 for one of the media is axially arranged, whereas the influx pipe section 15 for the second medium merges tangentially into the housing cover 2. Merely the dialysis cartridge 53 exhibits a modification relative to the cartridge 3 of FIG. 1 as far as the hollow fibers are arranged on the core along helical lines. The direction of the winding corresponds in this instance to the flow direction in the influx pipe section 15 so that an angle of between 90° and 180° is formed between the flow direction in the cover 2 and the direction of the hollow fibers at their open ends. The flow deflection at the entrance end is the smaller the larger the entrance angle of the medium from the ring chamber in the cover 2 to the hollow fibers.

Figure 8:
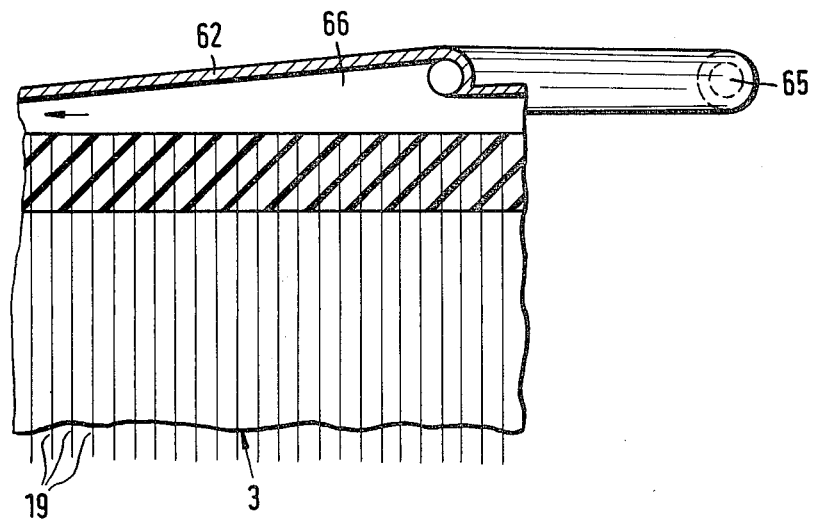
FIG. 8 is a developed sectional view along a cylinder area of a further detail of the invention.

FIG. 8 shows a sectional view along a circle at one facing end of an apparatus according to the invention in which the housing 1 and the cartridge 3 are formed in the same manner as in FIG. 1. The section extends here on a cylinder jacket and axially along the center of the chamber 16 in FIGS. 1 and 2 on a full turn. The drawing shows a development of the sectional plane. Thus, the entire turn of the chamber 16 is apparent. The housing cover 62 is provided with a tangentially extending influx pipe section 65 merging into a ring shaped inlet chamber 66. In principle the arrangement corresponds to that of FIG. 1 for the influx pipe section 15 and the inlet chamber 16. The influx chamber 66 of the example embodiment of FIG. 8 is differently constructed in its cross-section as compared to the inlet chamber 16 of the example embodiment of FIG. 1, the cross section of which is substantially unchanging. The cross section of the ring shaped inlet chamber diminishes along the circumference from the influx area of the influx pipe section 65. In this manner it is achieved that the circular flow speed in the ring shaped area in which the hollow fibers 19 merge is substantially the same all along the circumference. Thus, unnecessary flow speed changes in the circulation are avoided.

A reduction in the cross section in the radial direction may be provided in addition to the cross section reduction of the ring shaped chamber in the circulation direction. A uniform admission to the hollow fibers is achieved thereby in the radial direction of the facing surface of the fiber bundle, since the outward drive is compensated by the centrifugal force.

In principle, it is possible to construct the influx chamber or the inlet chamber in the same manner as the outflow chamber or the outlet chamber. However, it is also possible to contemplate, providing both ends of the housing of an apparatus according to the invention, with covers which are differently constructed in order to achieve the most advantageous result with regard to the flow through the entire apparatus.

Figure 9:
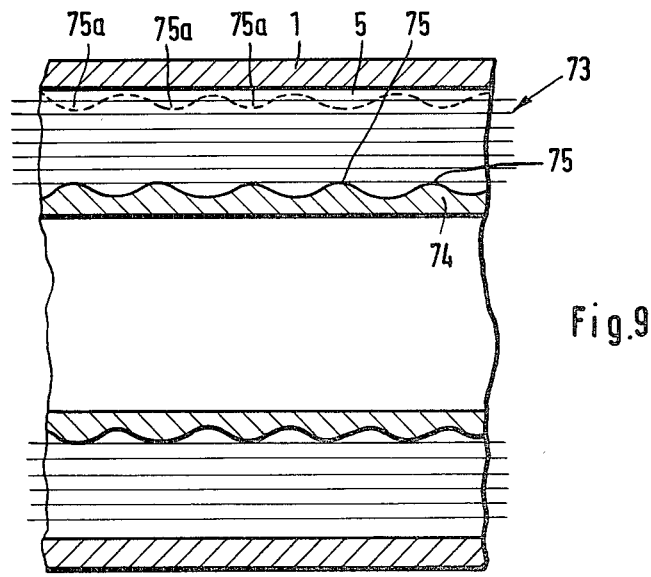
FIG. 9 is a sectional view of a portion of an apparatus according to the invention.

For the further improvement of the flow in the ring space 5, wherein the hollow fibers are arranged, the insert 73 may be constructed in the following manner according to FIG. 9. The outer surface of the force 74 may be provided in its major portion with projections or ridges 75 arranged as rings or spirals so that at these locations the diameter of the core is somewhat larger. It is not necessary that the distribution is uniform over the entire length of the core. Rather, intermediate zones may be made to be smooth in the manner described above. The hollow fibers themselves are displaced somewhat outwardly in the radial direction in the zones in which the ridges 75 are provided. In this manner it is made more difficult for the media flowing through the ring gap 5 to flow in parallel along the hollow fiber bundles and along the wall of the core. It is possible to shape the inner wall of the housing 1 in the same manner, as indicated at 75a in order to amplify the mentioned effect.

With regard to the dialysis space, the supply or discharge of the dialysis solution according to the invention also takes place through ring shaped hollow spaces. Such hollow spaces may suitably be produced by a narrowing of the core at both ends of the hollow fiber bundle whereby the hollow space is bounded outwardly by the bundle. Thus, a boundary surface is formed which constitutes the connection before the inflow of the dialysis liquid into the interstices between the fibers of the bundle, said boundary surface extending from said hollow space. Thus, the ring space for the dialysis solution may be located on the outside at one or both ends, whereby the housing comprises at its outer wall a respective extension. Such a ring space is then inwardly bounded by the bundle which forms in this embodiment the connection for the influx into the bundle. The inlet to and/or the outlet from the hollow spaces may be formed to extend radially, axially or tangentially. Further suitable embodiments of the invention are characterized in the preceding claims.

Although the invention has been described with reference to specific example embodiments, it is to be understood that it is intended to cover all modifications and equivalents within the scope of the appended claims.

What is claimed is:

1. An apparatus for the mass transfer between two media comprising housing means having two ends, core means located in said housing means, hollow fiber means surrounding said core means and having open ends facing toward the respective housing end as well as interstices between adjacent fibers, gasket means at each of said two housing ends, said hollow fiber means extending through said gasket means which thus separate said open ends from said interstices and hold said open ends in a common plane, said housing means comprising at each end thereof inflow means and outflow means for each of said two media, said inflow means comprising first ring chamber means located at one end of said housing means and communicating with said open ends of said hollow fibers, said outflow means comprising second ring chamber means located at the other end of said housing means, said inflow means and said outflow means further comprising respective connecting pipe section means, and wherein at least one of said first and second ring chamber means for that medium which flows through said hollow fiber means from one end to the other, comprises a hollow space facing said common plane of open fiber ends, said hollow space having a weight above said common plane which is largest in the area where the respective flow means merge into the corresponding hollow space and which height diminishes in a direction away from the respective flow means merging area, whereby said hollow space has a configuration which uniformly distributes the respective flowing medium over said common plane in which said open fiber ends are located, said hollow space configuration being located between the respective connecting pipe section and said open ends of said hollow fiber means.

2. The apparatus of claim 1, further comprising ring gap means between said housing means and said core means, said ring gap means extending around the core to contain the hollow fibers and comprising at least at one end of the housing an outwardly located ring chamber having a radially, axially, or tangentially extending connecting pipe section.

3. The apparatus of claim 1, wherein said hollow space is a ring chamber, said flow means being connected tangentially to said hollow space.

4. The apparatus of claim 1, wherein said hollow space is shaped as a funnel comprising inner and outer, frustum shaped boundary walls.

5. The apparatus of claim 4, wherein said funnel shaped hollow space tapers in its cross section toward the respective connecting pipe section means, and wherein said connecting pipe section means is tangentially connected to the hollow space adjacent to the narrow diameter end of said funnel shaped hollow space.

6. The apparatus of claim 1, wherein said flow means comprise a funnel shaped hollow space arranged at one end of said housing means and a further hollow space arranged at the opposite end of said housing means, said further hollow space comprising tangential connection means.

7. The apparatus of claim 1, wherein the cross section of said ring chamber means continuously tapers from the respective pipe section means through a circumferential angle of 360° to the connection of the respective pipe section means as viewed in the flow direction.

8. The apparatus of claim 1, wherein the cross section of said ring chamber means tapers in the radial direction and outwardly.

9. The apparatus of claim 1, wherein said hollow fiber means are arranged in a helical shape having a certain winding direction and wherein said connecting pipe section means extend tangentially into said hollow space, said winding direction of said hollow fiber means extending substantially in the same direction as said tangentially extending pipe section means.

10. The apparatus of claim 9, wherein the angle between the inflow direction into the hollow space means and the direction of the openings of the hollow fiber means is as close as possible to 180°.

11. The apparatus of claim 1, wherein said core means (4) comprises at its facing end surfaces (12) tubular extensions (10) registering with the respective pipe section means (6, 7), said tubular extensions (10) forming an integral part of the core and extending through the respective ring chamber means (16, 18), said tubular extensions (10) having openings (11) in their circumference, said openings (11) communicating through the hollow space (13a) with the interstices between said hollow fiber means.

12. The apparatus of claim 1, wherein said housing means and said core means have boundary wall means, at least one of said boundary wall means comprising at least in certain areas ring shaped or helically extending corrugations.

* * * * *

UNITED STATES PATENT OFFICE
CERTIFICATE OF CORRECTION

Patent No. 4,141,835            Dated February 27, 1979

Inventor(s) Wilfried Schael et al

It is certified that error appears in the above-identified patent and that said Letters Patent are hereby corrected as shown below:

In Claim 1, line 24, "weight" should be --height--.

Signed and Sealed this

Twelfth Day of June 1979

[SEAL]

Attest:

RUTH C. MASON
*Attesting Officer*

DONALD W. BANNER
*Commissioner of Patents and Trademarks*